Figures 15, 16:
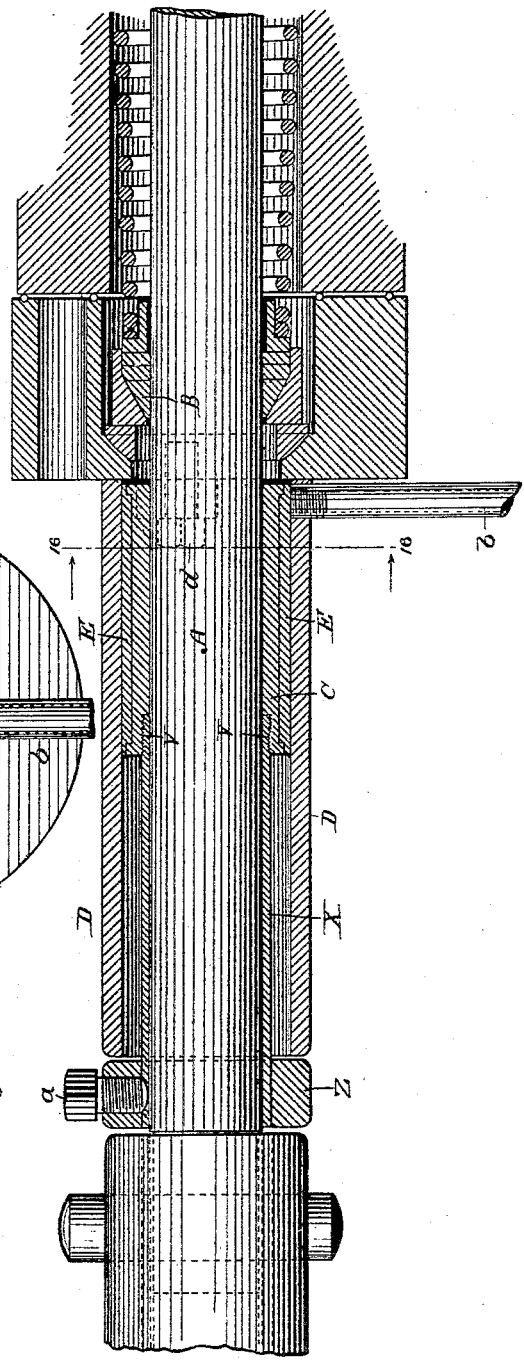

(No Model.) 11 Sheets—Sheet 1.
E. P. MONROE.
SUPPORTING MECHANISM FOR VALVE STEMS.
No. 369,358. Patented Sept. 6, 1887.
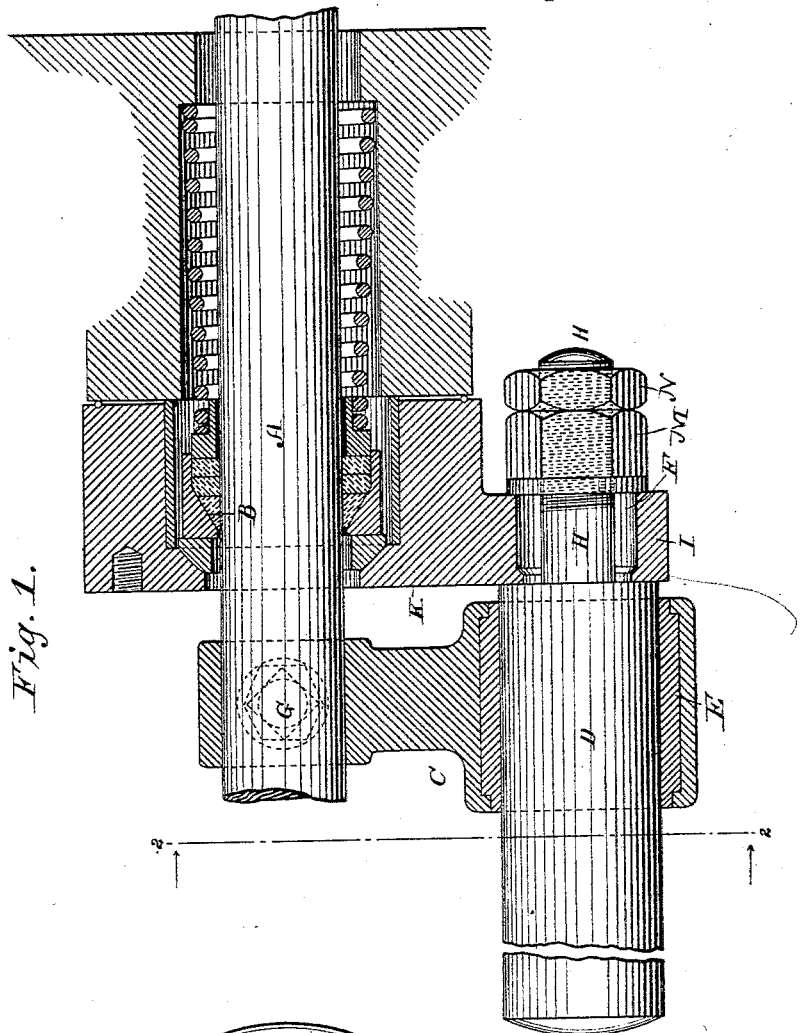
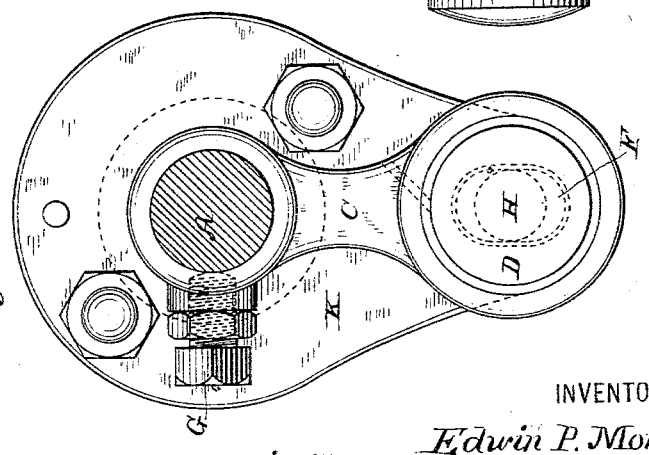
WITNESSES
E. A. Newman
C. M. Newman
INVENTOR
Edwin P. Monroe,
By his Attorneys
Baldwin Hopkins & Peyton (No Model.) 11 Sheets—Sheet 2.
E. P. MONROE.
SUPPORTING MECHANISM FOR VALVE STEMS.
No. 369,358. Patented Sept. 6, 1887.
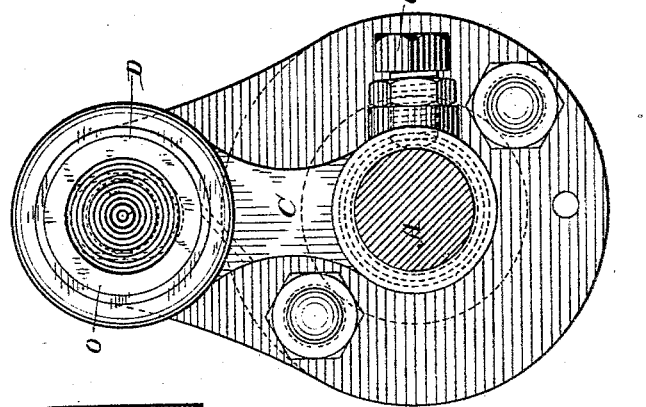
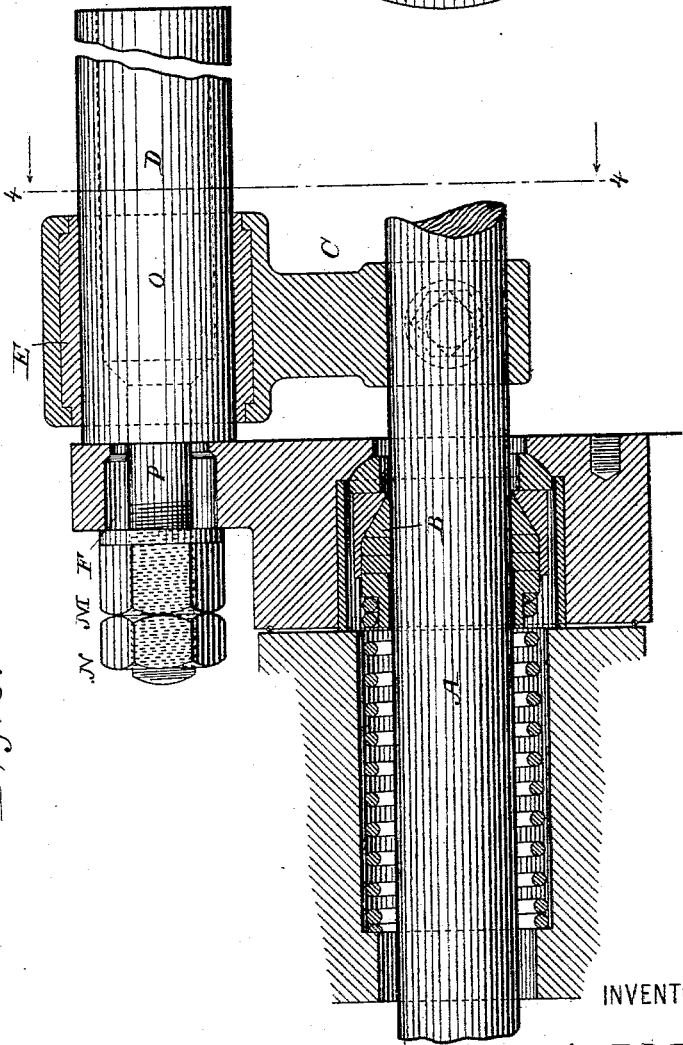
WITNESSES
E. C. Newman,
E. M. Newman.
INVENTOR
Edwin P. Monroe,
By his Attorneys
Baldwin Hopkins & Peyton

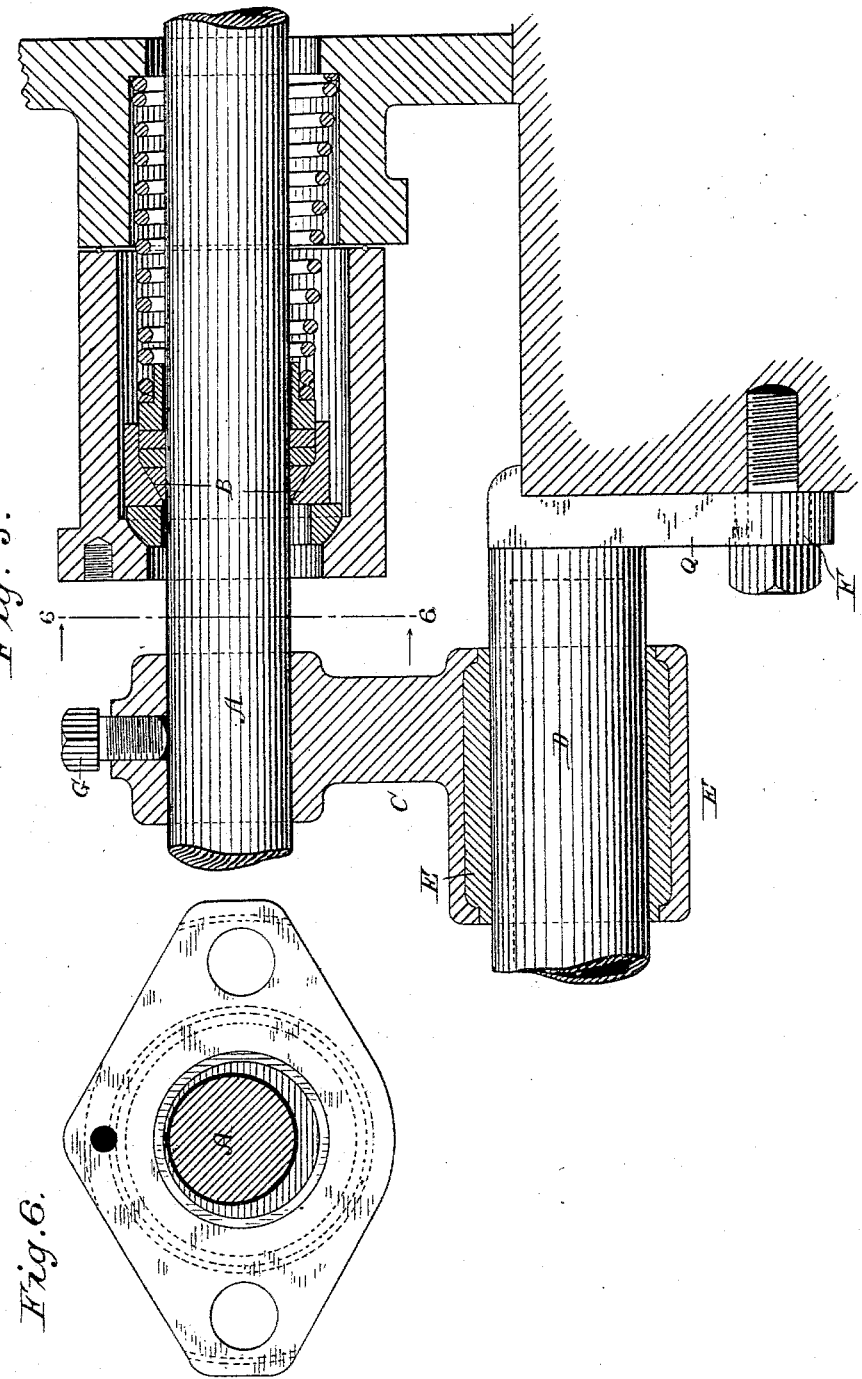

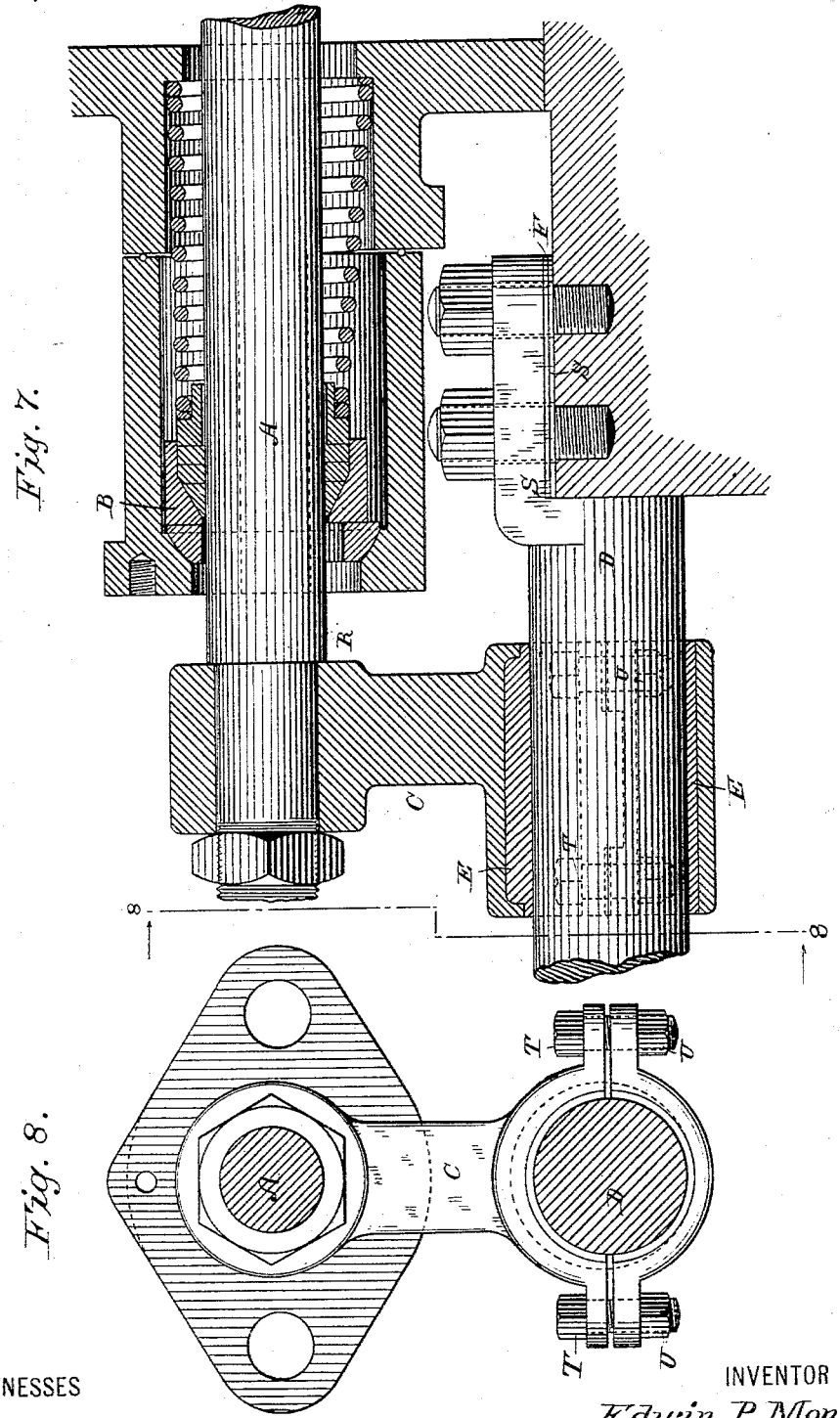

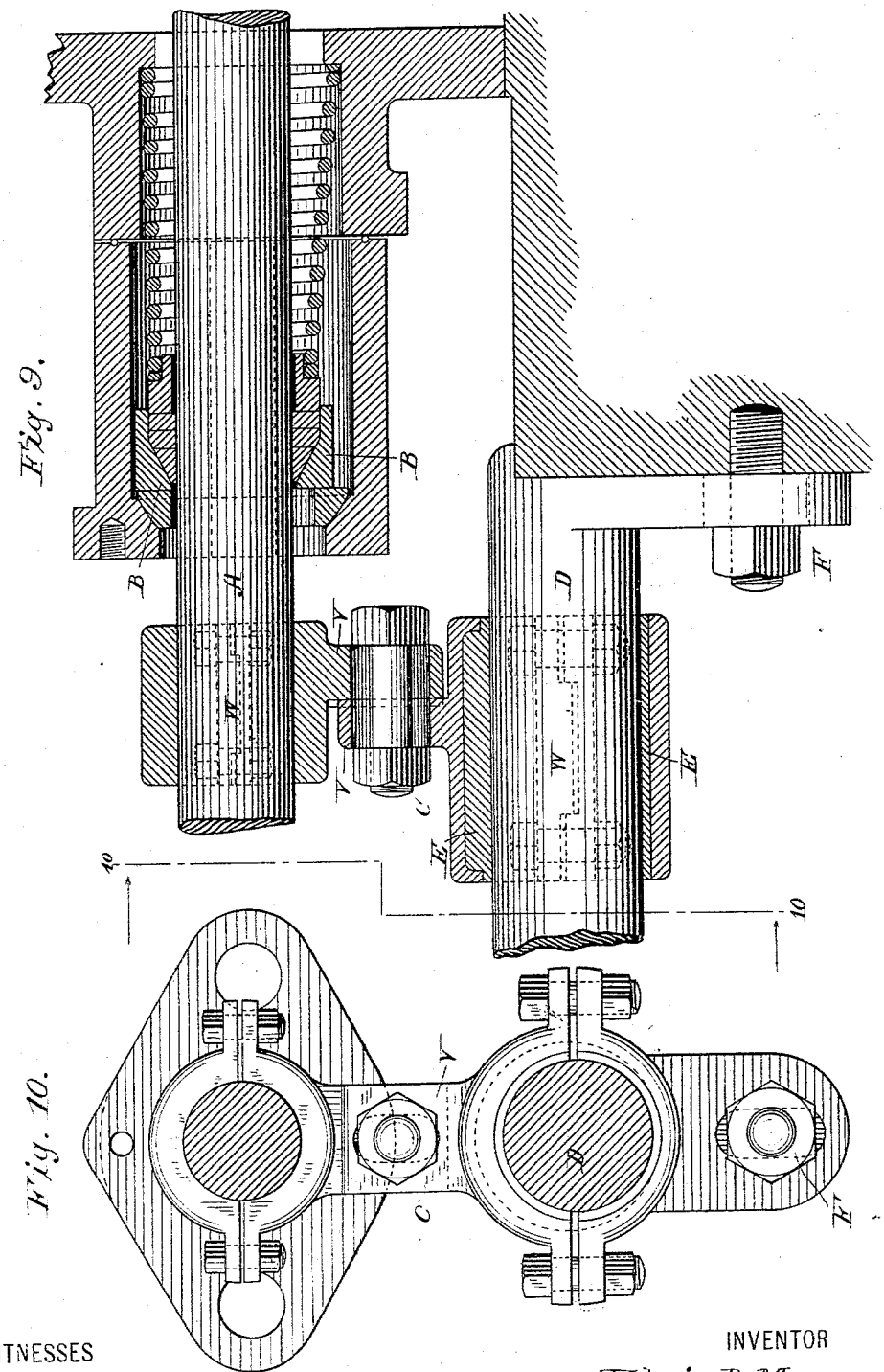

(No Model.) 11 Sheets—Sheet 6.
E. P. MONROE.
SUPPORTING MECHANISM FOR VALVE STEMS.
No. 369,358. Patented Sept. 6, 1887.
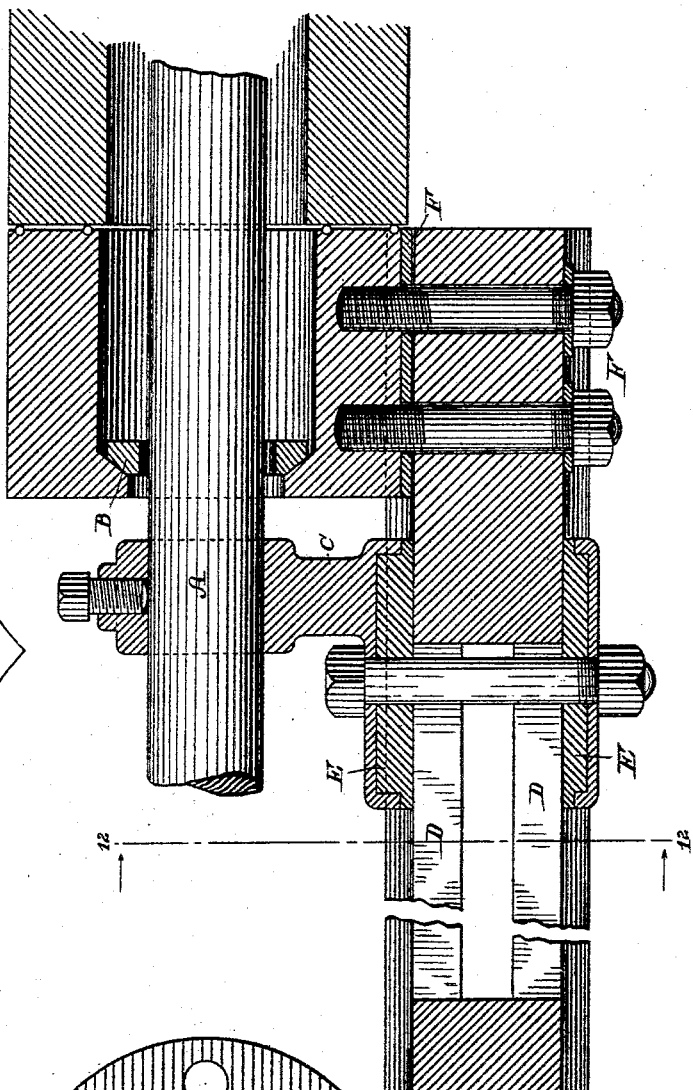
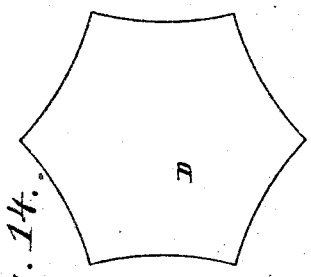
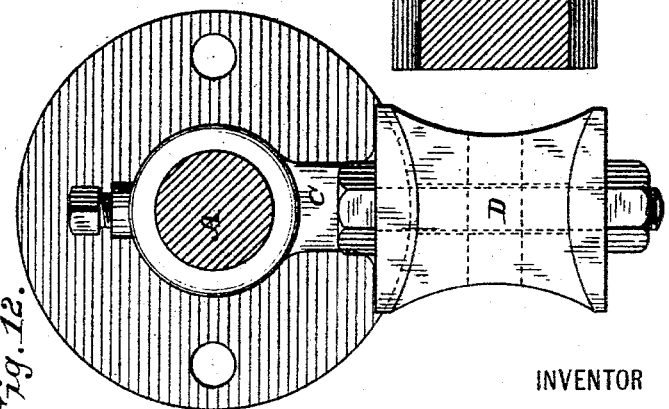
WITNESSES
E. A. Newman
C. M. Newman
INVENTOR
Edwin P. Monroe,
By his Attorneys
Baldwin Hopkins & Peyton (No Model.)  11 Sheets—Sheet 7.

E. P. MONROE.
SUPPORTING MECHANISM FOR VALVE STEMS.

No. 369,358. Patented Sept. 6, 1887.

WITNESSES
E. A. Newman.
C. M. Newman.

INVENTOR
Edwin P. Monroe,
By his Attorneys
Baldwin Hopkins & Peyton.

(No Model.) 11 Sheets—Sheet 8.
E. P. MONROE.
SUPPORTING MECHANISM FOR VALVE STEMS.
No. 369,358. Patented Sept. 6, 1887.

WITNESSES
E. A. Newman.
C. M. Newman.

INVENTOR
Edwin P. Monroe,
By his Attorneys
Baldwin Hopkins & Peyton.

(No Model.)

11 Sheets—Sheet 9.

E. P. MONROE.
SUPPORTING MECHANISM FOR VALVE STEMS.

No. 369,358. Patented Sept. 6, 1887.

WITNESSES
E. A. Newman,
C. M. Newman.

INVENTOR
Edwin P. Monroe,
By his Attorneys
Baldwin Hopkins & Peyton.

(No Model.) 11 Sheets—Sheet 10.

E. P. MONROE.
SUPPORTING MECHANISM FOR VALVE STEMS.

No. 369,358. Patented Sept. 6, 1887.

WITNESSES
E. A. Newman
C. M. Newman

INVENTOR
Edwin P. Monroe,
By his Attorneys
Baldwin Hopkins & Peyton.

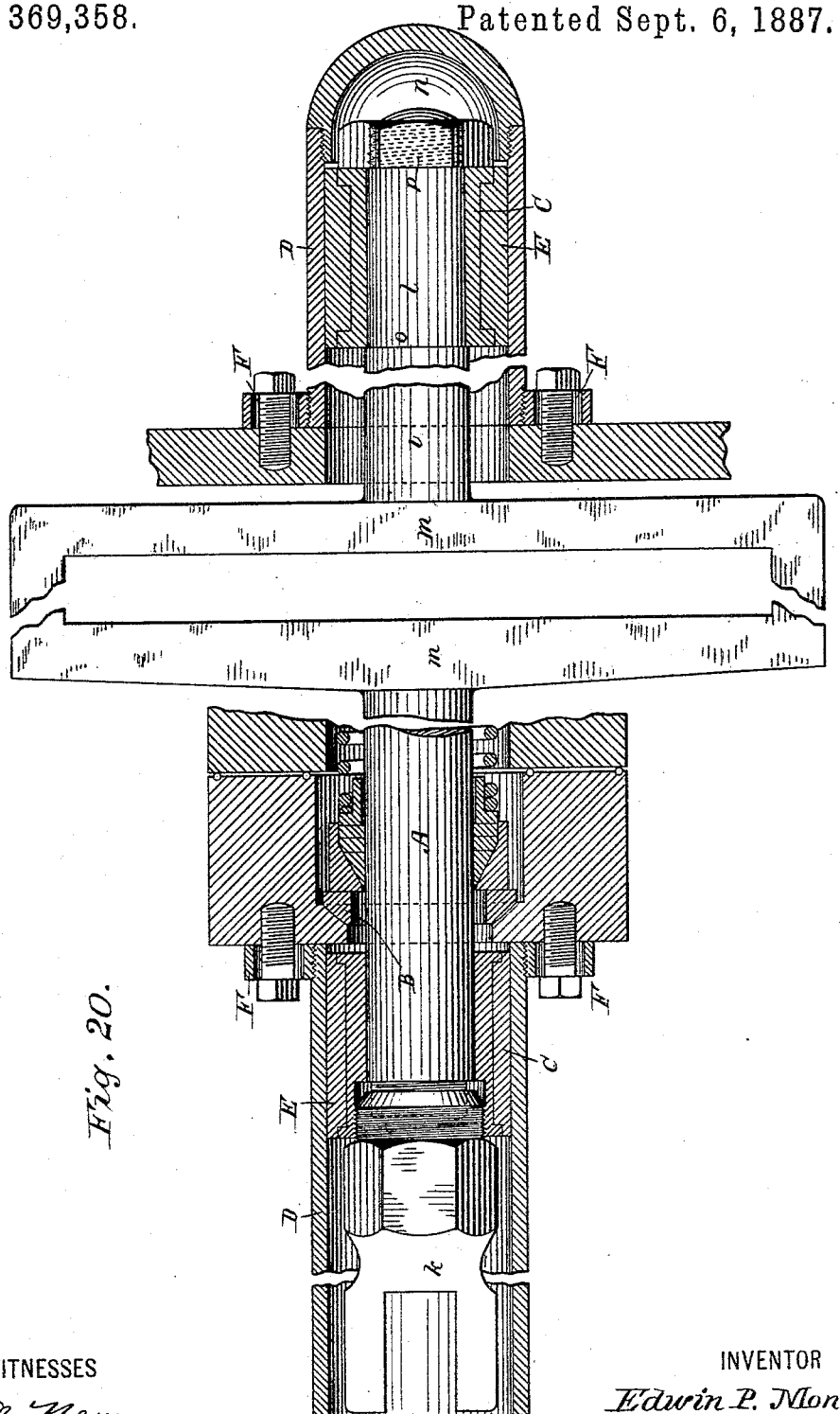

UNITED STATES PATENT OFFICE.

EDWIN P. MONROE, OF PHILADELPHIA, PENNSYLVANIA.

SUPPORTING MECHANISM FOR VALVE-STEMS.

SPECIFICATION forming part of Letters Patent No. 369,358, dated September 6, 1887.

Application filed September 30, 1886. Serial No. 215,016. (No model.)

*To all whom it may concern:*

Be it known that I, EDWIN P. MONROE, of Philadelphia, in the county of Philadelphia and State of Pennsylvania, have invented certain new and useful Improvements in Supporting Mechanism for Valve-Stems and other Like Moving Rods, of which the following is a specification, reference being had to the accompanying drawings.

My invention relates to supporting mechanism for the class of reciprocating rods which are liable to become worn, weakened, and deformed by friction—such, for example, as the valve-stems of locomotive-engines, &c. Such wearing and weakening sometimes results in bending, buckling, or breaking of valve-stems, or in their springing out of alignment under strain, so as not to properly operate the valves.

The object of my invention is to prevent all wear upon such valve stem or rods, and to provide means for reducing the wear of their supporting mechanism to the minimum, and for compensating for such minimum wear by adjustments and movements of parts, as hereinafter explained. The result is not only to secure the proper movement and action of valves, but also to prevent injury to valve-packings of whatever character by keeping the valve-rod in proper alignment as originally placed.

In the accompanying drawings, Figure 1 is a longitudinal vertical section showing one form of embodiment of my improved valve-stem-supporting mechanism, together with so much of ordinary connected parts, packing, &c., as necessary for illustration. Fig. 2 is a section at right angles with Fig. 1, taken on the line 2 2 of Fig. 1. Figs. 3 to 16, inclusive, (except Figs. 13 and 14, which are mere diagrams indicating two forms in which track-bars may be made,) are similar views, the odd-numbered figures being longitudinal vertical sections and the even-numbered figures being cross-sections, each two figures on each sheet showing embodiments of my invention differing in minor details from Figs. 1 and 2 and from each other. Figs. 17, 18, 19, and 20 are vertical longitudinal sections of other forms of embodiment of my invention.

Referring to the letters upon the drawings in aid of a description in detail of the several forms of embodiment of my improvements, A in all the figures indicates a valve-stem; B, valve stem-packing mechanism, which may be such as shown or of any other suitable character; C, a valve-stem carriage or support; D, a track or supporting bar for the carriage; E, an anti-friction bearing, preferably of Babbitt metal, between the carriage and its track or supporting-bar; and F, (except in Fig. 18, where none is shown,) adjusting mechanism for the supporting bar or track. From this outline of my improvements it will be perceived that I provide, in combination with a valve-stem, a carriage of varying form for directly supporting the stem and an adjustable track or supporting-bar of varying form for the carriage. I also use an anti-friction bearing, preferably of Babbitt metal, between the carriage and its supporting-track; but the anti-friction bearing is only preferable as a rule in practice, and is not an essential part of my invention.

Referring now to Figs. 1 and 2, G indicates a screw-bolt or set-screw for securing the carriage firmly to the valve stem, as illustrated, so that the carriage and stem, being set in proper relations to each other, always move together. In this instance the carriage is a short pillar or block bored at the top to admit the valve-stem and at the bottom to admit the track or supporting bar, both of which, as illustrated, are cylindrical. The Babbitt-metal anti-friction bearing in this instance is a hollow cylinder shouldered into the lower opening in the carriage, as shown. The adjusting mechanism in this instance consists of a screw-threaded stem or shank, H, upon the end of the supporting-bar, which passes through a slot or opening in a lug or projection, I, depending from the packing-case K. Lock-nuts M and N by clamping action hold the track-bar firmly in place. By loosening these nuts the track-bar may be adjusted up or down, or it may be rotated more or less. The result is that the wear of the track-bar at a given point and the wear of the Babbitt-metal cylindrical bearing correspondingly may each be compensated for by rotating the track-bar and adjusting it vertically at will. The carriage may be removed by unscrewing the bolt G and slipping it off the stem and track, proper joints or connections, which are not illustrated, of ordinary character, being provided. The carriage, being removed, may be rebushed or relined with Babbitt metal and replaced again in position. Only so much of the connected parts as are absolutely necessary to show the relations of my improvements in these figures and in all the figures are illustrated.

Referring now to Figs. 3 and 4, it will be seen that the carriage and track-bar are in reverse position as compared with Figs. 1 and 2—that is to say, they are placed above the valve-stem—so that the carriage and stem depend from the track-bar. In this instance, also, it will be observed that the track-bar is composed of two parts—one a hollow cylinder, O, bored out at the bottom to admit a countersunk headed bolt, P, which forms its stem or shank. In other respects Figs. 3 and 4 are similar to Figs. 1 and 2.

Referring now to Figs. 5 and 6, it will be observed that the supporting-shank Q of the track-bar, which is a hollow cylinder, is at right angles with the track-bar, so as to accommodate a different structure of the connected parts of an engine, and yet secure the proper vertical adjustments for compensating wear. The shank may be integral with or a separate piece fixed to the track-bar.

Referring now to Figs. 7 and 8, it will be seen that a shoulder, R, is formed on the valve-stem by turning down a portion of it and reducing its diameter, and the carriage is secured to it by a nut upon the threaded turned-down portion of the stem. It will also be observed that the shank of the track-bar rests upon an adjacent portion of the structure of the engine, and is adjusted up and down by means of bolts and nuts and thin plates or liners S. It will also be observed that the lower part of the carriage is composed of two parts slightly separated and secured in place by bolts T and nuts U. The nuts can be screwed up or unscrewed at pleasure, so as to make the lower part of the carriage bear properly at all points upon the cylindrical track-bar to keep the carriage from jumping or being unseated. It will also be observed that the Babbitt-metal bushing is made thicker above, where most wear comes, than below.

Referring now to Figs. 9 and 10, the only peculiarities that need be pointed out are the facts that the upper part as well as the lower part of the carriage is made of two pieces clamped together around the valve-stem by bolts and nuts in the manner just described, and as will be obvious from the drawings, and that the carriage is divided in the middle and provided with projections V V, each of which has an elongated slot, the two being clamped together by means of a bolt and nut, as shown. This gives an additional vertical adjustment, so that in this instance the carriage is composed of four parts bolted together adjustably. For greater strength the upper and lower parts of the carriage are united by a mortise and tenon, as indicated in dotted lines at W.

Referring now to Figs. 11 and 12, the track-bar is shown as having concave surfaces, and the Babbitt metal of the carriage is correspondingly convex. The carriage is in two parts, bolted together, so as to provide an upper and lower bearing-surface upon the track to prevent the carriage from being thrown up or unseated. These figures present only a formal variation of Fig. 1, for example.

Figs. 13 and 14, being mere outlines, need not be further described.

Referring now to Figs. 15 and 16, it will be observed that the track or supporting bar is a hollow cylinder, within which the valve-stem is supported and works upon the carriage and anti-friction bearing. Here I also use a concave instead of a convex bearing-surface on the track and a convex bearing-surface on the carriage. The details of construction of this form of embodiment of my invention are, so far as they are peculiar and not heretofore described, as follows: X indicates a cylindrical shell or sleeve, preferably of steel, surrounding the valve-stem and screw-threaded at Y, where it is united to the hollow cylindrical carriage provided with a hollow cylindrical Babbitt-metal bearing. At the opposite end of the sleeve X is brazed onto it or otherwise firmly secured a metal ring, Z. Through this ring and through the shell passes a screw-bolt or set-screw, a, impinging against the valve-stem and serving to hold the sleeve and stem firmly together, whereby the carriage and Babbitt-metal bearing are united to the stem through the instrumentality of the sleeve, as will appear plain from an inspection of Fig. 15. b indicates a vent composed of a small tube screwed into the hollow cylindrical track. The track is adjustable vertically in this instance by means of a slotted plate, c, and screw-bolts d, clamping it to the valve-packing case, as will be understood without further description.

Figure 17:
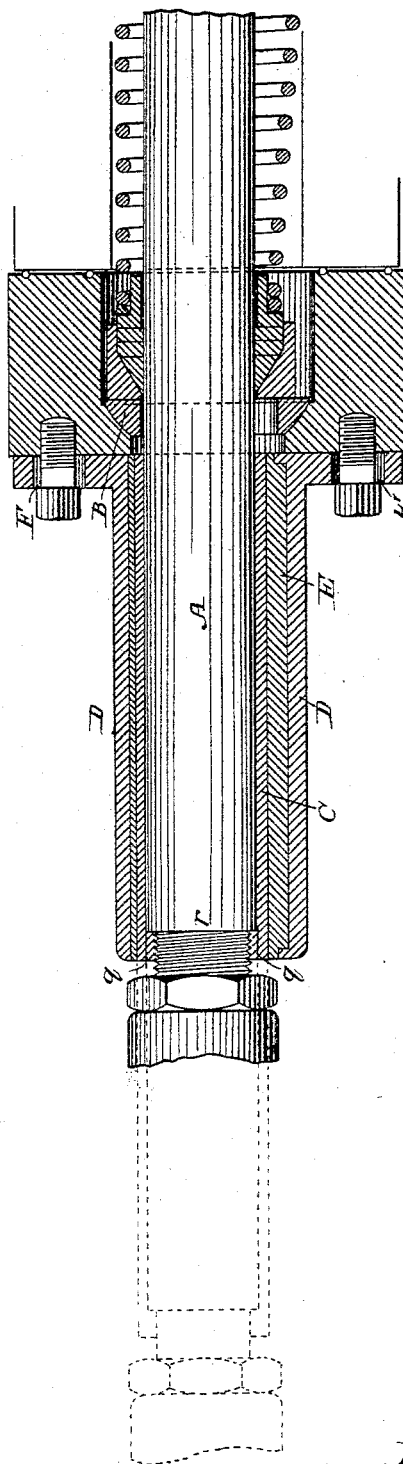

Referring now to Fig. 17, the supporting-bar is shown babbitted its entire length, and the bar is adjustable in a manner already described. In this instance the Babbitt metal is stationary and secured to the track instead of to the carriage. An internally screw-threaded ring, q, may be secured by brazing or otherwise within one end of the cylindrical carriage and screwed upon the reduced threaded end r of the valve-stem. This secures the carriage firmly to the stem; but the internally screw-threaded ring might be dispensed with, although it furnishes a good method of securing the carriage and stem together.

Figure 18:
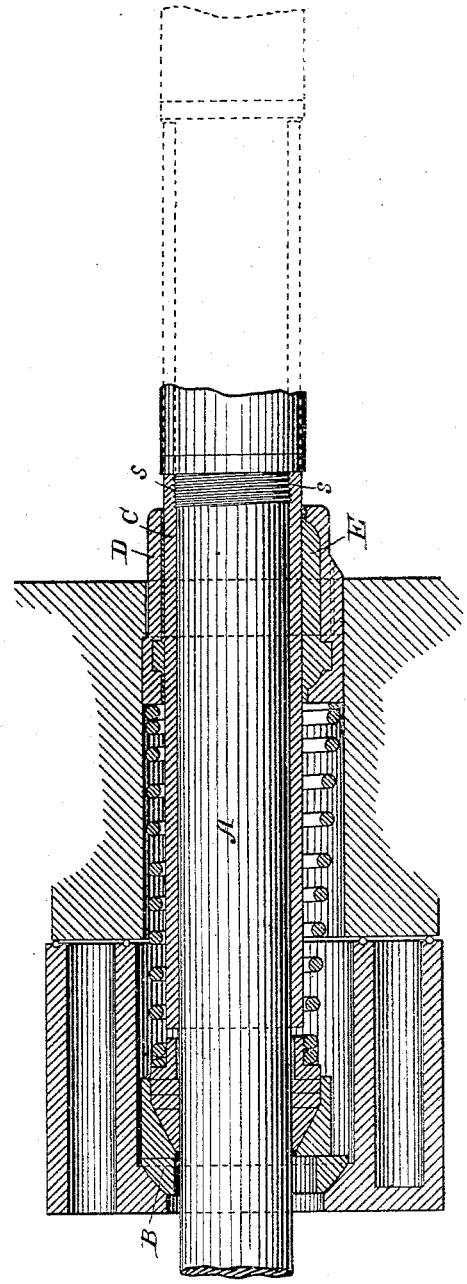

Referring now to Fig. 18, there is also shown the Babbitt metal stationary within the hollow cylindrical track-bar. The hollow cylindrical carriage is internally screw-threaded at s, where it screws onto the stem without the interposition of the internally screw-threaded ring, just above described. This form is applicable in new engines or where there is sufficient enlargement to allow the stem to be screw-threaded at its junction with the yoke.

Figure 19:
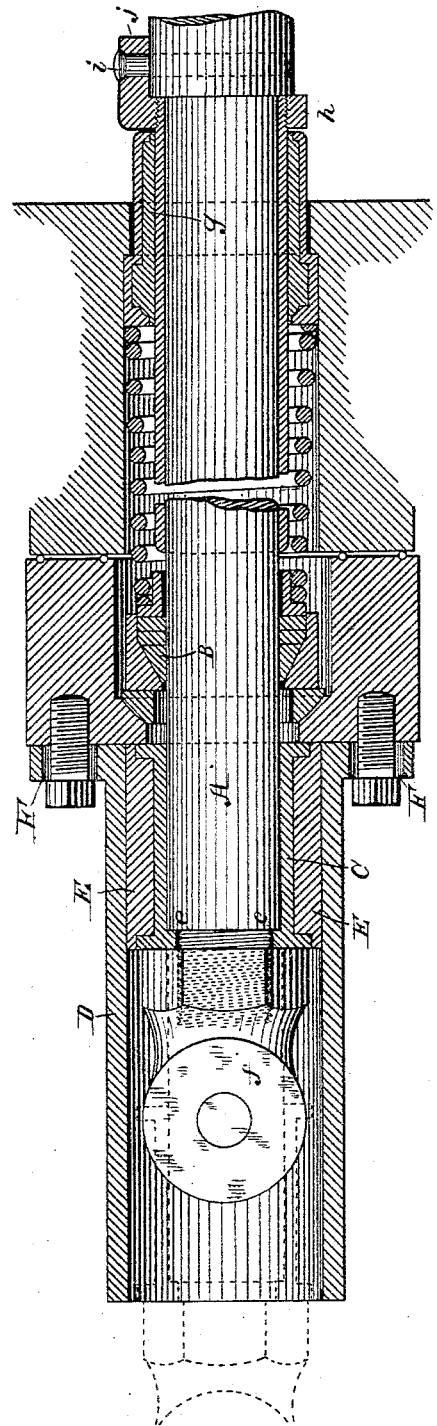

Referring now to Fig. 19, it shows a structure of similar nature to that shown in Figs. 15 and 16, but differing in the method of attaching the carriage to the valve-stem. This form may be employed on valve-stems which have a joint or hinge to fasten them to the connecting-rod, which joint has so little clearance between it and the face of the stuffing-box that there is not room for the device shown in Fig. 15. In this instance the carriage is made to abut against a shoulder, e, on the stem, and is held in place by a hinge-coupling nut, f. As valve-stems having such joints require double support, I insert a cylindrical track-bar and Babbitt-metal bushing into the bottom of the stuffing-box, as shown at g, and protect the stem from wear by a cylindrical carriage, as shown at the right-hand side of this figure, which is secured to the stem by means of a thimble-nut, h, and a bolt, i, passing through an arm, j, connected with or projecting from the yoke. (Not illustrated.)

Referring now to Fig. 20, a valve-stem is shown which has a joint that travels into the hollow cylindrical supporting-bar. The carriage in this instance has an internal screw-thread, into which is screwed the threaded joint or hinge-piece k, as illustrated. This piece also screws over the reduced end of the stem. The support of the stem at the opposite end is obtained by the use of a horn, l, formed on the yoke m, which horn works into a hollow cylindrical track or supporting bar screw-threaded at both ends for attachment to an adjustable plate bolted to the steam-chest and for receiving a cap, n. The horn is turned down and shouldered at o to receive a babbitted carriage, as shown, and is provided with a threaded end to receive a nut, p, which secures the carriage in place. I thus provide, as illustrated in Fig. 20, for supporting each end of the valve-stem adjustably by means of a carriage and track-bar, so that each end of the stem is absolutely protected against any wear whatever, and the wear upon the carriage or its Babbitt-metal lining and upon the track-bar can be compensated for by adjustment and turning of the track-bar or carriage, if need be, whereby the stem may always be kept centered, so as to cause the least possible wear or disturbance of the packing around the stem and to operate the yoke and valves with precision and the best results.

From the foregoing illustrations it will be apparent that my invention, in its broadest aspect, is capable of being applied to various sorts of engines, both old and new. Other forms of track may be used and varying formal modifications of parts may be made without departing from the substance of my invention. The formal variations shown illustrate some of the modifications that are convenient.

Having thus described my improvements, what I claim as new, and desire to secure by Letters Patent of the United States, is—

1. The combination, with a valve stem or rod, of a carriage for the stem and an adjustable bar or track supporting the weight of the carriage and one end of the stem, substantially as set forth.

2. The combination, with a valve stem or rod, of a carriage for the stem and a vertically-adjustable supporting bar or track for the carriage, which bar is also adapted to be rotated more or less to compensate for wear, substantially as set forth.

3. The combination, with a valve stem or rod, of a carriage for the stem and a hollow adjustable supporting bar or track for the carriage, provided with a threaded bolt of a separate piece of metal forming a stem for adjustment of the track, substantially as set forth.

4. The combination, with a valve stem or rod, of a carriage for the stem and a track or supporting-bar for the carriage, provided with a shank for supporting and adjusting the track, substantially as set forth.

5. The combination, with a valve-stem, of a carriage for the stem and a supporting bar or track for the carriage, the carriage composed of two parts bolted together adjustably between the track and valve-stem, substantially as set forth.

6. The combination, with a valve-stem, of a hollow carriage and a hollow supporting bar or track, substantially as set forth.

7. The combination of the valve-stem and its packing and the carriage and adjustable track at one end with the yoke and its horn and a carriage and adjustable track for the horn, substantially as set forth.

In testimony whereof I have hereunto subscribed my name.

EDWIN P. MONROE.

Witnesses:
MARCUS S. HOPKINS,
W. C. DUVALL.